(12) United States Patent
Dombrowski et al.

(10) Patent No.: US 11,608,195 B1
(45) Date of Patent: Mar. 21, 2023

(54) SPACECRAFT ORBIT DETERMINATION SYSTEM

(71) Applicant: Government of the United States, as represented by the Secretary of the Air Force, Wright-Patterson AFB, OH (US)

(72) Inventors: Daniel M. Dombrowski, Fairborn, OH (US); Robert A. Bettinger, Oakwood, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 94 days.

(21) Appl. No.: 17/467,548

(22) Filed: Sep. 7, 2021

(51) Int. Cl.
  *B64G 1/24* (2006.01)
  *B64G 1/62* (2006.01)
  *B64G 1/10* (2006.01)

(52) U.S. Cl.
  CPC ............. *B64G 1/242* (2013.01); *B64G 1/105* (2013.01); *B64G 1/62* (2013.01); *B64G 2001/1064* (2013.01)

(58) Field of Classification Search
  CPC .......... B64G 1/242; B64G 1/105; B64G 1/62; B64G 2001/1064
  See application file for complete search history.

(56) References Cited

U.S. PATENT DOCUMENTS

| 11,312,512 B1* | 4/2022 | Betti | B64G 1/62 |
| 2022/0135255 A1* | 5/2022 | Langill | B64G 1/105 |
| | | | 244/158.4 |

OTHER PUBLICATIONS

Buckingham, A.G.; Watson, H. M.; Basic Concepts of Orbiting Reflectors J. Spacecraft, 1968, 5, 7, 851-854.
Canady Jr., J. E.; Allen Jr., J. L.; Illumination From Space With Orbiting Solar-Reflector Spacecraft, NASA Technical Paper 2065, 1982, 1-96.
Vallado, D. A.; Carter, S. S.; Accurate Orbit Determination from Short-Arc Dense Observational Data The Journal of the Astronautical Sciences, 1998, 46, 2, 195-213.

* cited by examiner

*Primary Examiner* — Valentina Xavier
(74) *Attorney, Agent, or Firm* — AFMCLO/JAZ; James F. McBride

(57) ABSTRACT

The present invention relates to a resident space object orbit determination system comprising a high efficiency module for determining a resident space object's orbit and a highly efficient method for determining same. Applicants developed a method and system to determine the orbits of residence space objects including resident space objects that do not reflect energy that is directed at them and/or may be coated to minimize the ability to accurately see such resident space objects. Thus, a method, a module and a system for making such determinations that can easily and inexpensively be added to an early warning reentry system is provided.

11 Claims, 5 Drawing Sheets

MODE 1: Initial Orbit Determination

MODE 2: Orbit Estimation

SPACECRAFT ORBIT DETERMINATION SYSTEM

RIGHTS OF THE GOVERNMENT

The invention described herein may be manufactured and used by or for the Government of the United States for all governmental purposes without the payment of any royalty.

FIELD OF THE INVENTION

The present invention relates to a resident space object orbit determination system comprising a high efficiency module for determining a resident space object's orbit and a highly efficient method for determining same.

BACKGROUND OF THE INVENTION

There are numerous resident space objects such as the 3700 plus satellites orbiting earth. Such satellites range in mass from a few kilograms to over 129,000 kilograms and travel approximately 28,000 kilometers per hour. Due to the size of the larger satellites, they do not burn up on reentry. If a relatively large satellite were to impact a densely populated area without warning, loss of life and significant crash site damage is a possibility.

Recent uncontrolled atmospheric reentries of low Earth orbiting spacecraft have further highlighted the necessity of determining the orbits of resident space objects so accurate reentry time and location predictions can be made. Not all resident space objects orbit's can be determined by current methods such as range and rate methods such as radar and laser range finding, angles only methods such as visual observation. Thus, what is needed is a method of determining a resident space objects' orbit that does not rely on current methods.

Applicant recognized that the source of the problems associated with current prediction methods is that certain resident space objects do not reflect energy that is directed at them and/or may be coated to minimize the ability to accurately see such resident space object. Thus, making current methods of determining such resident space object's orbit ineffective. However, Applicants recognized that such resident space objects produce energy shadows. Based on such recognition, Applicants developed a method and system to determine the orbits of residence space objections including resident space objects that do not reflect energy that is directed at them and/or may be coated to minimize the ability to accurately see such resident space objects. Such method and system are provided herein.

SUMMARY OF THE INVENTION

The present invention relates to a resident space object orbit determination system comprising a high efficiency module for determining a resident space object's orbit and a highly efficient method for determining same. Applicants developed a method and system to determine the orbits of residence space objections including resident space objects that do not reflect energy that is directed at them and/or may be coated to minimize the ability to accurately see such resident space objects. Thus, a method, a module and a system for making such determinations that can easily and inexpensively be added to an early warning reentry system is provided.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
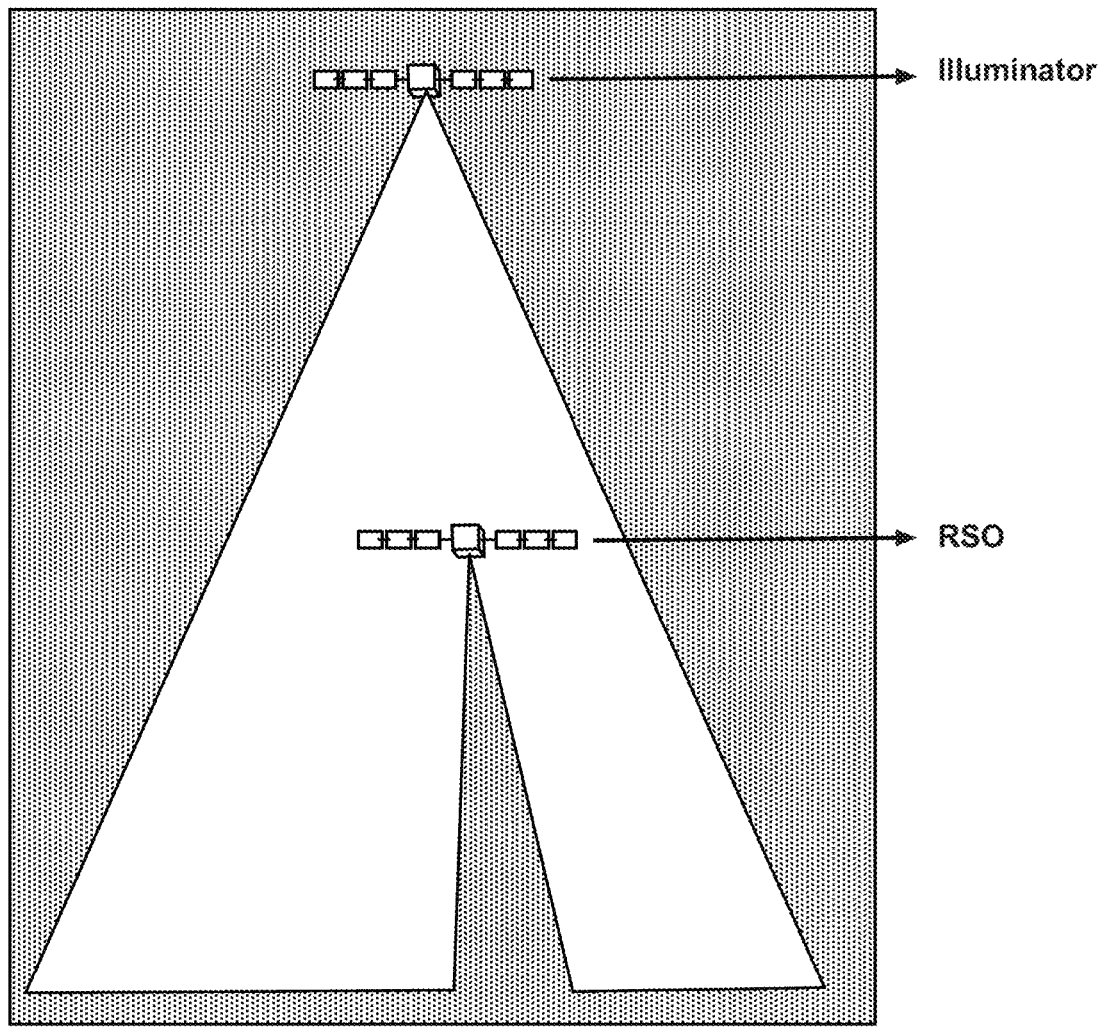
FIG. 1 Depicts a two-dimensional view of the energy shadow caused by a lower altitude resident space object passing through the energy cone of the illuminator spacecraft.
Figure 2:
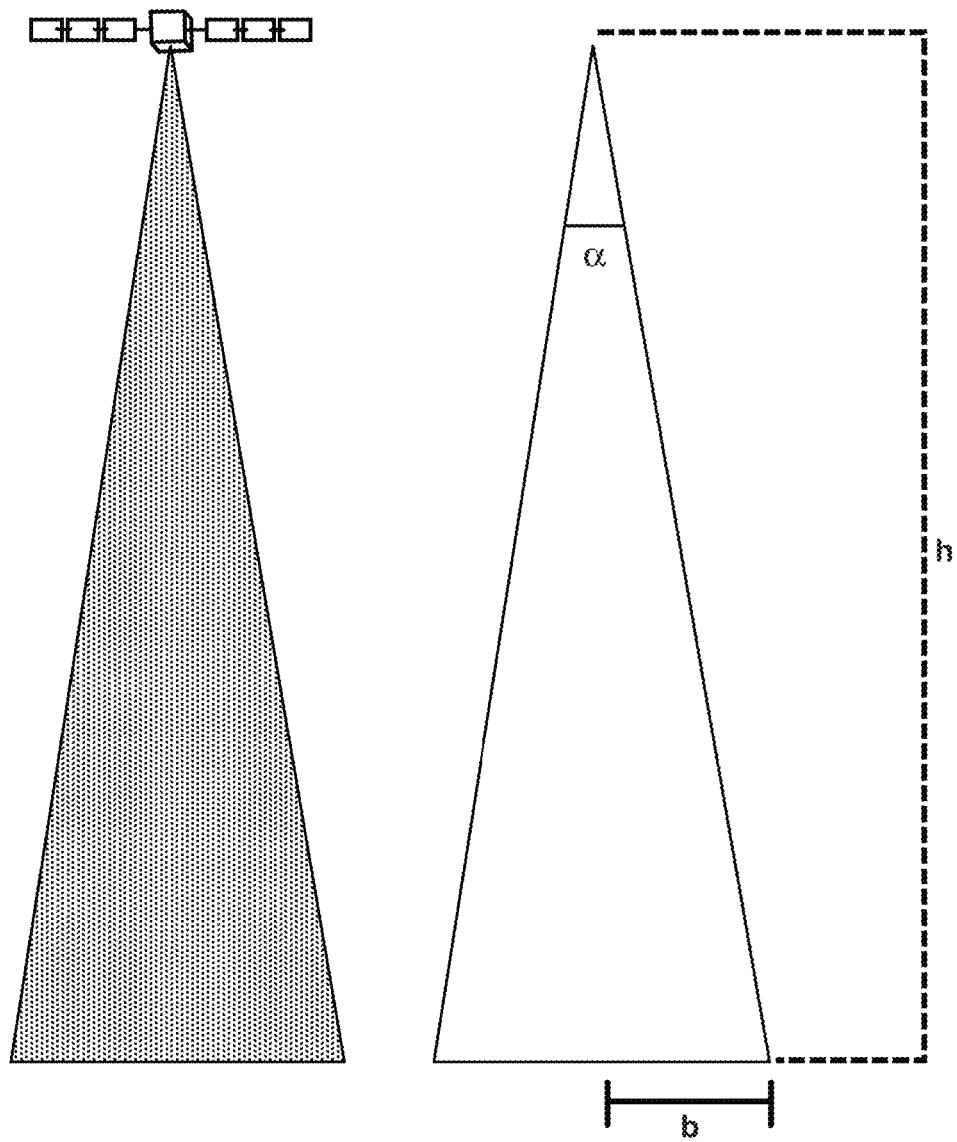
FIG. 2. Depicts the two-dimensional energy shadow geometry as viewed along the energy shadow's minor axis.
Figure 3:
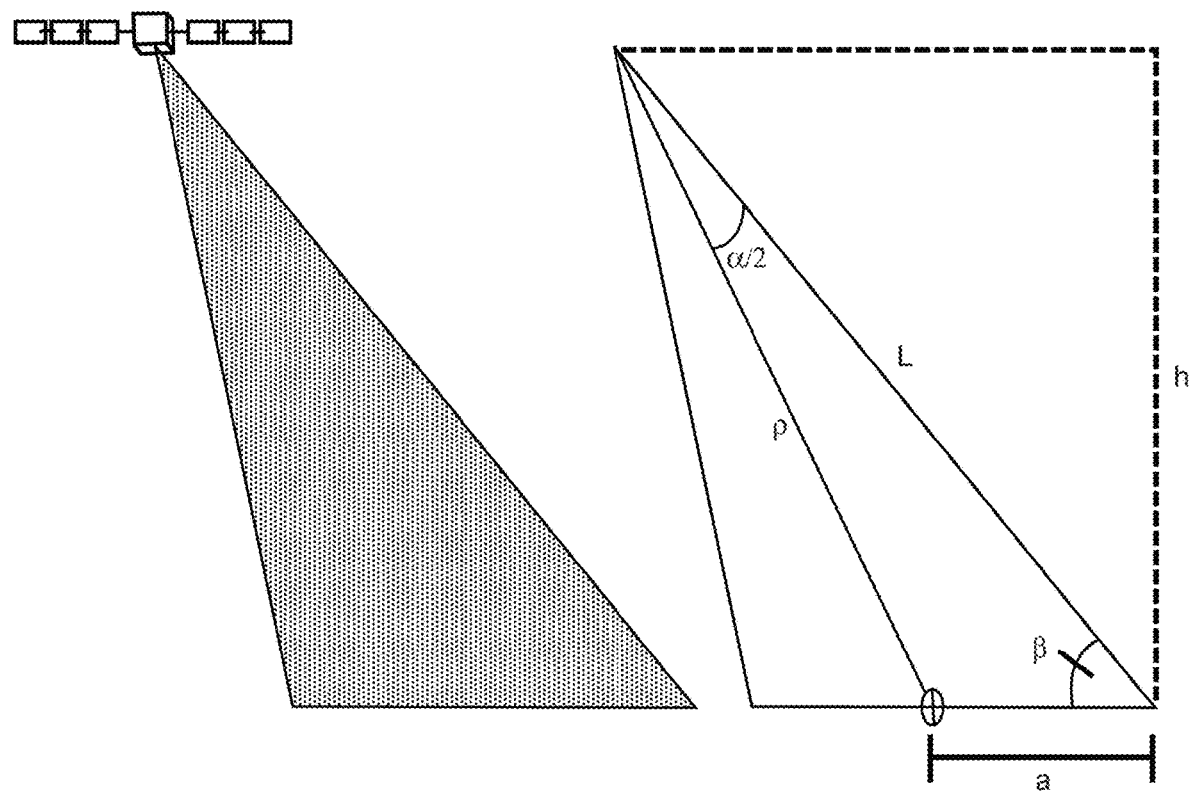
FIG. 3 Depicts the two-dimensional energy shadow geometry as viewed along the energy shadow's major axis.
Figure 4:
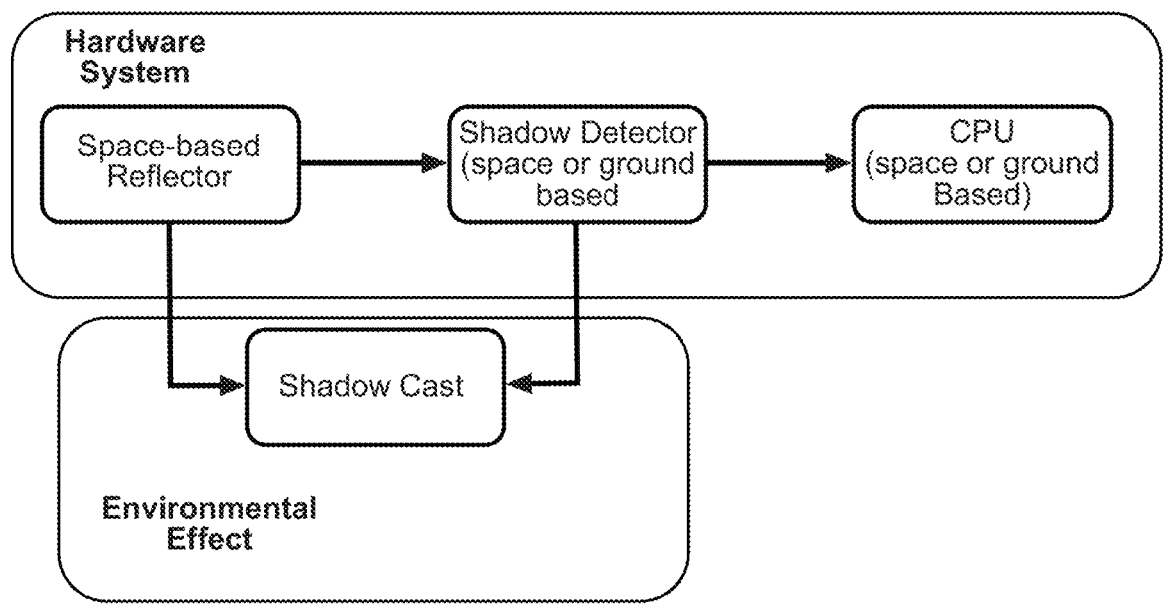
FIG. 4 Depicts the initial orbit determination hardware interfaces.
Figure 5A:
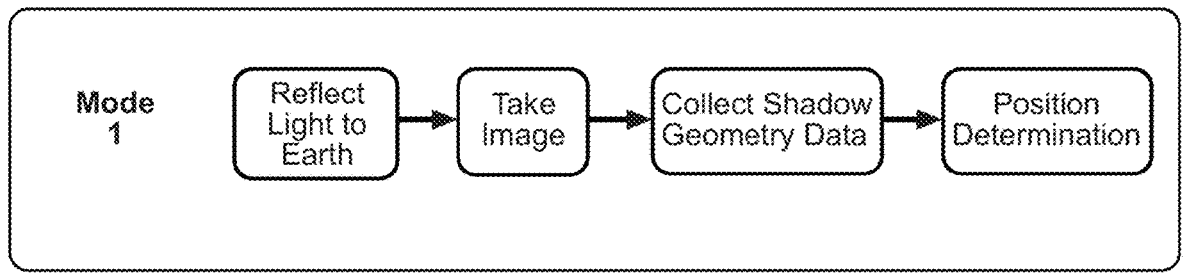
FIG. 5A Depicts an initial orbit determination process flow.
Figure 5B:
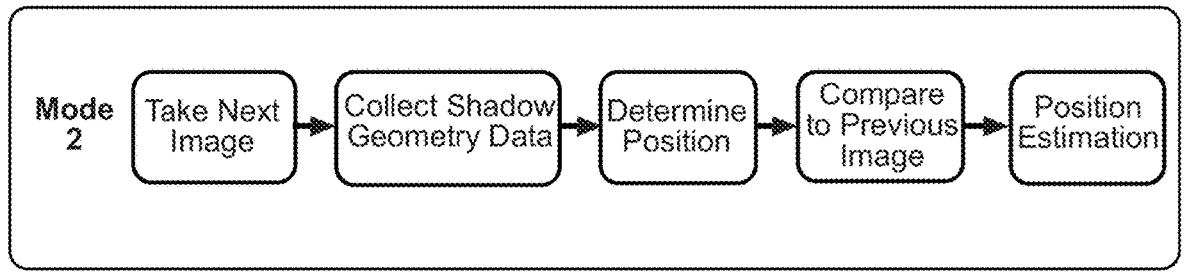
FIG. 5B Depicts an orbit estimation process flow.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Definitions

Unless specifically stated otherwise, as used herein, the terms "a", "an" and "the" mean "at least one".

As used herein, the terms "include", "includes" and "including" are meant to be non-limiting.

As used herein, the words "about," "approximately," or the like, when accompanying a numerical value, are to be construed as indicating a deviation as would be appreciated by one of ordinary skill in the art to operate satisfactorily for an intended purpose.

As used herein, the words "and/or" means, when referring to embodiments (for example an embodiment having elements A and/or B) that the embodiment may have element A alone, element B alone, or elements A and B taken together.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Background

Nomenclature $\tilde{W}$=the vector y-z position of a shadow's centroid on an image plane $W_y$=the scalar y position of a shadow's centroid on an image plane $W_z$=the scalar z position of a shadow's centroid on an image plane b=minor axis length of a shadow C=major axis length of a shadow α=angle of energy divergence h=altitude of resident space object above the gravitational body's surface ρ=scalar distance from the shadow centroid to the resident space object $R_\oplus$=scalar radius of the gravitational body $\overline{R}$=displacement vector $O_{IR}$=reference frame rotation matrix $\overline{V}$=velocity vector N=time step $\hat{D}_r$=instantaneous direction of travel unit vector μ=the standard primary gravitational parameter of the selected gravitational body Subscripts R=Relative measurement of the resident space object with respect to the energy point source L=Measurement of the energy point source with respect to the primary gravitational body T=Measurement of the resident space object with respect to the primary gravitational body Superscripts I=measured with respect to an inertial frame R=measured with respect to a rotating frame For purposes of this specification, headings are not considered paragraphs and thus this paragraph is paragraph twenty-two of the present specification. The individual number of each paragraph above and below this paragraph can be determined by reference to this paragraph's number. In this paragraph twenty-two, Applicants disclose a method of determining a resident space object's orbit:

a) obtaining from a resident space object's having an energy shadow, a shadow centroid location for said energy shadow $\tilde{W}$ comprising a dimension $W_y$ and a dimension $W_z$; a minor axis for said energy shadow b; a major axis for said energy shadow C; and an angle of energy divergence α, said energy shadow being created by said resident space object absorbing and/or reflecting energy from an energy point source;

b) computing, above a gravitational body having a surface and a gravitational center, an altitude h above said gravitational body's surface for said resident space object by inserting said minor axis b, angle of energy divergence α into the following equation:

$$h = \frac{b}{\tan(\alpha)} \quad (1)$$

c) computing a relative position ρ for said resident space object with respect to said resident space object's energy shadow's shadow centroid in the two dimensional plane running parallel to the energy shadow's major axis by inserting said major axis C, said angle of energy divergence α, and said altitude h of said resident space object into the following equations:

$$\rho = \sqrt{C^2 + L^2 - 2CL\cos(\beta)} \quad (2)$$

wherein L and β are obtained by simultaneously solving the following equations:

$$\cos(\beta - 90^0) = \frac{h}{L} \quad (3)$$

$$\frac{C}{\sin(\alpha)} = \frac{L}{\sin(180^0 - \alpha - \beta)} \quad (4)$$

d) computing a relative position of said resident space object with respect to said energy point source $\overline{R}^R_R$ in the energy point source's frame of reference by inserting an inertial position of said energy point source $\overline{R}^I_L$, a radius of the gravitational body of said resident space object's orbit $R_\oplus$, the altitude above said gravitational body's surface of said resident space object's orbit h, the energy shadow position $\tilde{W}$ of said energy shadow, the relative position ρ for said resident space object with respect to said resident space object's energy shadow's shadow centroid into the following equations:

$$\overline{R}^R_R = \left[ \|\overline{R}^I_L\| - (R_\oplus + h), W_y - \rho * \frac{\tilde{W}}{\|\tilde{W}\|}, W_Z - \rho * \frac{\tilde{W}}{\|\tilde{W}\|} \right]^T \quad (5)$$

e) computing a relative position of said spacecraft with respect to said energy point source $\overline{R}'_R$ in the inertial primary gravitational body's frame of reference by inserting an inertial position of said energy point source $\overline{R}'_L$, an inertial velocity of said point source $\overline{V}_L^I$, and the relative position of said resident space object with respect to said energy point source $\overline{R}^R_R$ into the following equations:

$$\hat{O}_1 = -\frac{\overline{R}^I_L}{\|\overline{R}^I_L\|} \quad (6)$$

$$\hat{O}_3 = \frac{\overline{V}^I_L \times \overline{R}^I_L}{\|\overline{V}^I_L \times \overline{R}^I_L\|} \quad (7)$$

$$\hat{O}_2 = \hat{O}_3 \times \hat{O}_1 \quad (8)$$

$$C_{IR} = [\hat{O}_1 \ \hat{O}_2 \ \hat{O}_3] \quad (9)$$

$$\overline{R}^I_R = C_R \cdot \overline{R}^R_R \quad (10)$$

f) computing a position $\overline{R}'_T$ of said resident space object with respect to said gravitational body's gravitational center by inserting said relative position of said resident space object with respect to said energy point source $\overline{R}'_R$ and said position of said energy point source $\overline{R}'_L$ into the following equations:

$$\overline{R}'_T = \overline{R}'_L + \overline{R}'_R \quad (11)$$

g) computing a velocity $\overline{V}_T^I$ for said resident space object by a position vector and time technique, preferably said velocity $\overline{V}_T^I$ is computed by:

(i) by obtaining a first $\bar{R}^I_T$, $\bar{R}^I_{T1}$ at a first time $N_1$ and a second $R_T$, $\bar{R}^I_{T2}$ at a second time $N_2$ after said first time $N_1$ and inserting said $\bar{R}^I_{T2}$, $\bar{R}^I_{T2}$, $N_1$, and $N_2$ into the following equations:

$$\bar{R}^I_{T1.5} = \frac{\bar{R}^I_{T2} - \bar{R}^I_{T1}}{2} \quad (12)$$

$$\bar{V}^I_{T1.5} = \frac{\bar{R}^I_{T2} - \bar{R}^I_{T1}}{N_2 - N_1} \quad (13)$$

(ii) by obtaining a first $\bar{R}^I_T$,$\bar{R}^I_{T1}$ at a first time $N_1$ and a second $R_T$,$\bar{R}^I_{T2}$ at a second time $N_2$ after said first time $N_1$ and inserting said $\bar{R}^I_{T1}$, $\bar{R}^I_{T2}$, $N_1$, and $N_2$ into the following equation to obtain a $\hat{D}_r$ direction of travel said spacecraft between said first time $N_1$ and said second time $N_2$:

$$\hat{D}_r = \frac{\bar{R}^I_{T2} - \bar{R}^I_{T1}}{\|\bar{R}^I_{T2} - \bar{R}^I_{T1}\|} \quad (14)$$

then inserting $\hat{D}_r$,$\bar{R}^I_{T1}$, $\bar{R}^I_{T2}$ and a standard gravitational parameter μ for said gravitational body into the following equations:

$$\bar{R}^I_{T1.5} = \frac{\bar{R}^I_{T2} - \bar{R}^I_{T1}}{2} \quad (15)$$

$$\bar{V}^I_{T1.5} = \sqrt{\frac{\mu}{\frac{\bar{R}^I_{T2} - \bar{R}^I_{T1}}{2}}} \cdot \hat{D}_r \quad (16)$$

or (iii) by obtaining at least three position and time pairs: $\bar{R}^I_{T1}$ at a first time $N_1$, $\bar{R}^I_{T2}$ at a second time $N_2$, and $\bar{R}^I_{T3}$ at a third time $N_3$ said second time $N_2$ being after said first time $N_1$, and said third time $N_3$ being after said second time $N_2$ and fitting a curve to said at least three position and time pairs to obtain said velocity $\nabla_T^I$ for said resident space object;

h) pairing an $R_T$, with its respective N for said $R_T$ with $\nabla_T^I$ which is the orbit for said resident space object, preferably said $R_T$ is $R_{T2}$, said N is $N_2$; and i) providing a notification via a communication system regarding the orbit of said resident space object, preferably said notification is provided to a human and/or a computer.

The method of paragraph twenty-two wherein said resident space object is a satellite, an orbital debris, a meteorite or a moon.

The method of paragraphs twenty-two through twenty-three wherein said gravitational body is a planet, preferably said gravitational body is the earth.

The method of paragraphs twenty-two through twenty-four wherein said energy point source is a solar reflector, the sun, a spacecraft that comprises a device for providing an electromagnetic energy beam, preferably said electromagnetic energy beam comprises visible light A module comprising a central processing unit programmed to predict resident space object's orbit according to the method of paragraphs twenty-two through twenty-five. The program may be written in any programming language that is desired. Examples of programming languages include: C++, Matlab, VBA and C#.

The module of paragraph twenty-six, said module comprising an input/output controller, a random access memory unit, a hard drive memory unit, and a unifying computer bus system, said input/output controller being configured to receive a digital signal and transmit said signal to said central processing unit and retrieve a signal comprising the resident space object's orbit from said central processing unit.

A system for determining a resident space object's orbit comprising:

a) a module according paragraphs twenty-six or twenty-seven;

b) a transmitter for transmitting the resident space object's orbit determination provided by said module to a communication network; and c) an internal and/or external power source for powering said system.

Examples

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Example 1. The astronautical orbit determination method is implemented for a solar reflector spacecraft and an imager spacecraft in a close proximity leader-follower formation in a geostationary orbit. At 1900 UTC 29 Jul. 2023 (N1) the imager spacecraft detects a shadow cast by a lower unidentified resident space object and takes two pictures one-half second apart. The imagers on-board computer converts the pictures into the reflector satellite's view. The first picture's centroid location is observed to be at position W̃=(1999.9998,1999.9567) km , the semiminor axis length is observed to be b=23.2503 km, and the semimajor axis length is observed to be C=23.2511 km. The second pictures' centroid location is observed to be at position W̃=(2014.0440,1979.0269) km , the semiminor axis length is observed to be b=23.2496 km, and the semimajor axis length is observed to be C=23.2500 km. The known solar energy divergence angle is α=0.00465 radians.

Using these values along with in equation 1 yields an altitude of the unidentified spacecraft of:

h=5000.0203 km

Using equations 2-4 the length of rho is calculated to be:

ρ=5000.0203 km

Using these values along with equation 5 the relative position of the unidentified spacecraft with respect to the solar reflector in the solar reflector's local vertical local horizontal reference frame is calculated to be:

$$\overline{R1}^R_R = \begin{bmatrix} 30{,}788.0797 \\ 0.0002 \\ -0.0037 \end{bmatrix} km$$

Using these values along with equations 6-10 the relative position of the unidentified spacecraft with respect to the solar reflector is rotated into the inertia frame and found to be:

$$\overline{RT}_R^I = \begin{bmatrix} -30{,}788.0797 \\ -0.0002 \\ 0.0037 \end{bmatrix} \text{ km}$$

Adding the previous vector to the inertial position vector of the reflector as shown in equation 11 yields:

$$\overline{RT}_R^I = \begin{bmatrix} 11378.1573 \\ -0.0002 \\ 0.0037 \end{bmatrix} \text{ km}$$

Performing the same steps on the second image calculates the relative position of the unidentified spacecraft with respect to the solar reflector in the inertial reference frame is calculated to be:

$$\overline{R2}_R^I = \begin{bmatrix} 11378.0874 \\ 1.6230 \\ 1.8043 \end{bmatrix} \text{ km}$$

Using the circular assumption as shown in equations 14-16 the final position and velocity is calculated as follows:

$$\overline{R}_{T1.5}^I = \begin{bmatrix} 11378.1224 \\ 0.8114 \\ 1.8080 \end{bmatrix} \text{ km}$$

$$\overline{V}_{T1.5}^I = \begin{bmatrix} -0.1707 \\ 3.9615 \\ 4.3943 \end{bmatrix} \text{ km/s}$$

$N_{1.5} = N1 + 0.5$ second

Having an R1.5, V1.5, and an N1.5 the orbit of the unidentified resident space object is fully defined. This information can be relayed to a ground station that can then update the current catalog of resident space objects.

Example 2. The astronautical orbit determination method is implemented for an interplanetary spacecraft conducting a flyby of Jupiter. At 1900 UTC 29 Jul. 2023 (N1) the imager spacecraft detects and takes two pictures one second apart of the shadow cast by the one of Jupiter's Galilean moons. The spacecraft's on-board computer virtually rotates the picture into the sun's field of view as found by its on-board sun sensors. The first picture's centroid location is observed to be at position $\tilde{W}=(0,0)$ km, the semiminor axis length is observed to be b=1628.9 km, and the semimajor axis length is also observed to be C=1628.9 km, indicating a circle. Due to the moon's rotation rate being so slow approximately the same values are measured for a picture taken a second later. The known solar energy divergence angle is α=0.00465 radians.

Using these values along with in equation 1 yields an altitude of the moon:

h=350308 km Using equations 2-4 the length of rho is calculated to be:

ρ=350308 km

Using these values along with equation 5 the relative position of the moon with respect to the sun in the Sun-Jupiter pointing local vertical local horizontal reference frame is calculated to be:

$$\overline{RT}_R^R = \begin{bmatrix} 778507000 \\ 0 \\ 0 \end{bmatrix} \text{ km}$$

Using these values along with equations 6-10 the relative position of the unidentified spacecraft with respect to the solar reflector is rotated into the inertia frame and found to be:

$$\overline{RT}_R^I = \begin{bmatrix} 778507000 \\ 0 \\ 0 \end{bmatrix} \text{ km}$$

Adding the previous vector to the inertial position vector of the reflector as shown in equation 11 yields:

$$\overline{RT}_R^I = \begin{bmatrix} 350308 \text{ km} \\ 0 \\ 0 \end{bmatrix} \text{ km}$$

Using the linear assumption as shown in equation 12-13 the final position and velocity is calculated as follows:

$$\overline{RT}_{T1.5}^I = \begin{bmatrix} 350308 \text{ km} \\ 0 \\ 0 \end{bmatrix} \text{ km}$$

$$\overline{V}_{T1.5}^I = \begin{bmatrix} 0 \\ 17.2968 \\ 0 \end{bmatrix} \text{ km/s}$$

$N_{1.5} = N1 + 0.5$ second

Having an R1.5, V1.5, and an N1.5 the orbit of the moon is fully defined. Comparison of the data with known astrophysical parameters shows that the moon who's shadow the spacecraft spotted was Io. This information can be relayed to a ground station to update current astrophysical models or be used in an on-board deep space orbit determination program for the spacecraft.

The astronautical orbit determination method is implemented for a reflector spacecraft and an imager spacecraft in a leader-follower formation in a geostationary orbit at an altitude of approximately 35,788 km over the 157 degrees west longitude point above the Pacific Ocean. This configuration will allow identification of resident space objects within altitudes of approximately 35,788 km. A rocket with a payload of multiple CubeSats plans to deploy the CubeSats within the nadir facing illumination area of the reflector satellite. Often CubeSat attitude control systems cannot immediately correct the rotational motion produced from deployment which makes persistent radio communication links, and therefore spacecraft identification, difficult. Upon deployment, each CubeSat will create a shadow that is detected by the imager spacecraft with an onboard CPU which uses the orbit determination method to estimate the state parameterization of the objects casting the shadows. These parameterizations are then transmitted to a ground station and used to refine an accurate orbit for each of the CubeSats post deployment.

The astronautical orbit determination method is implemented for a reflector spacecraft in geostationary orbit and a series of ground-based illumination sensors spread over an area of approximately 22 km in radius below the geostationary reflector. The reflected light is centered on the ground sensor area and illumination dips due to resident space objects casting shadows are measured across the sensors. This configuration will allow identification of resident space objects within the low earth orbit regime to an altitude of approximately 4,500 km. These illumination dips are recorded and send to a CPU running the orbit determination algorithm to estimate the state parameterization of the objects casting the shadows.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method of determining a resident space object's orbit:
   a) obtaining from a resident space object's having an energy shadow, a shadow centroid location for said energy shadow $\tilde{W}$ comprising a dimension $W_y$ and a dimension $W_z$; a minor axis for said energy shadow b; a major axis for said energy shadow C; and an angle of energy divergence $\alpha$, said energy shadow being created by said resident space object absorbing and/or reflecting energy from an energy point source;
   b) computing, above a gravitational body having a surface and a gravitational center, an altitude h above said gravitational body's surface for said resident space object by inserting said minor axis b, angle of energy divergence $\alpha$ into the following equation:

$$h = \frac{b}{\tan(\alpha)}$$

c) computing a relative position $\rho$ for said resident space object with respect to said resident space object's energy shadow's shadow centroid in the two dimensional plane running parallel to the energy shadow's major axis by inserting said major axis C, said angle of energy divergence $\alpha$, and said altitude h of said resident space object into the following equations:

$$\rho = \sqrt{C^2 + L^2 - 2CL\cos(\beta)}$$

wherein L and $\beta$ are obtained by simultaneously solving the following equations:

$$\cos(\beta - 90°) = \frac{h}{L}$$

$$\frac{C}{\sin(\alpha)} = \frac{L}{\sin(180° - \alpha - \beta)}$$

d) computing a relative position of said resident space object with respect to said energy point source $\overline{R}^R_R$ in the energy point source's frame of reference by inserting an inertial position of said energy point source $\overline{R}^I_L$, a radius of the gravitational body of said resident space object's orbit $R_\oplus$, the altitude above said gravitational body's surface of said resident space object's orbit h, the energy shadow position $\tilde{W}$ of said energy shadow, the relative position $\rho$ for said resident space object with respect to said resident space object's energy shadow's shadow centroid into the following equations:

$$\overline{R}^R_R = \left[ \|\overline{R}^I_R\| - (R_\oplus + h), W_y - \rho * \frac{\tilde{W}}{\|\tilde{W}\|}, W_z - \rho * \frac{\tilde{W}}{\|\tilde{W}\|} \right]^T$$

e) computing a relative position of said spacecraft with respect to said energy point source $\overline{R}'_R$ in the inertial primary gravitational body's frame of reference by inserting an inertial position of said energy point source $\overline{R}'_L$, an inertial velocity of said point source $\nabla_L{}'$, and the relative position of said resident space object with respect to said energy point source $\overline{R}^R_R$ into the following equations:

$$\hat{O}_1 = -\frac{\overline{R}^I_L}{\|\overline{R}^I_L\|}$$

$$\hat{O}_3 = \frac{\overline{V}^I_L \times \overline{R}^I_L}{\|\overline{V}^I_L \times \overline{R}^I_L\|}$$

$$\hat{O}_2 = \hat{O}_3 \times \hat{O}_1$$

$$C_{IR} = [\, \hat{O}_1 \quad \hat{O}_2 \quad \hat{O}_3 \,]$$

$$\overline{R}^I_R = C_{IR} \cdot \overline{R}^R_R$$

f) computing a position $\overline{R}'_T$ of said resident space object with respect to said gravitational body's gravitational center by inserting said relative position of said resident space object with respect to said energy point source $\overline{R}'_R$ and said position of said energy point source $\overline{R}'_L$ into the following equations:

$$\overline{R}'_T = \overline{R}'_L + \overline{R}'_R$$

g) computing a velocity $\nabla_T{}'$ for said resident space object by a position vector and time technique;
   h) pairing an $R_T$, with its respective N for said $R_T$ with $\nabla_T{}'$ which is the orbit for said resident space object; and
   i) providing a notification via a communication system regarding the orbit of said resident space object.

2. The method of claim 1 wherein:
   a) said velocity $\nabla_T{}'$, is computed by:
      (i) by obtaining a first $\overline{R}'_T$, $\overline{R}'_{T1}$ at a first time $N_1$ and a second $R_R$, $\overline{R}'_{T2}$ at a second time $N_2$ after said first time $N_1$ and inserting said $\overline{R}'_{T1}, \overline{R}'_{T2}, N_1$, and $N_2$ into the following equations:

$$\overline{R}^I_{T1.5} = \frac{\overline{R}^I_{T2} - \overline{R}^I_{T1}}{2}$$

$$\overline{V}^I_{T1.5} = \frac{\overline{R}_{T2} - \overline{R}_{T1}}{N_2 - N_1}$$

(ii) by obtaining a first $\overline{R}'_T$, $\overline{R}'_{T1}$ at a first time $N_1$ and a second $R_T$, $\overline{R}'_{T2}$ at a second time $N_2$ after said first time $N_1$ and inserting said $\overline{R}'_{T1}$, $\overline{R}'_{T2}, N_1$, and $N_2$ into the following equation to obtain a $\hat{D}_r$ direction of travel said spacecraft between said first time $N_1$ and said second time $N_2$:

$$\hat{D}_r = \frac{\overline{R}_{T2}^I - \overline{R}_{T1}^I}{\|\overline{R}_{T2}^I - \overline{R}_{T1}^I\|}$$

then inserting $\hat{D}_r$, $\overline{R}'_{T1}$, $\overline{R}'_{T2}$ and a standard gravitational parameter µ for said gravitational body into the following equations:

$$\overline{R}_{T1.5}^I = \frac{\overline{R}_{T2}^I - \overline{R}_{T1}^I}{2}$$

$$\overline{V}_{T1.5}^I = \sqrt{\frac{\mu}{\frac{\overline{R}_{T2}^I - \overline{R}_{T1}^I}{2}}} \cdot \hat{D}_r$$

or (iii) by obtaining at least three position and time pairs: $\overline{R}'_{T1}$ at a first time $N_1$, $\overline{R}'_{T2}$ at a second time $N_2$, and $\overline{R}'_{T3}$ at a third time $N_3$ said second time $N_2$ being after said first time $N_1$, and said third time $N_3$ being after said second time N2 and fitting a curve to said at least three position and time pairs to obtain said velocity $\nabla_T^I$ for said resident space object;

b) said $R_T$ is $R_{T2}$, said N is $N_2$; and c) said notification is provided to a human and/or a computer.

3. The method of claim 1 wherein said resident space object is a satellite, an orbital debris, a meteorite or a moon.

4. The method of claim 1 wherein said gravitational body is a planet.

5. The method of claim 4 wherein said gravitational body is the earth.

6. The method of claim 1 wherein said energy point source is a solar reflector, the sun, a spacecraft that comprises a device for providing an electromagnetic energy beam.

7. The method of claim 6 wherein said electromagnetic energy beam comprises visible light.

8. A module comprising a central processing unit programmed to predict resident space object's orbit according to the method of claim 1.

9. The module of claim 8 said module comprising an input/output controller, a random access memory unit, a hard drive memory unit, and a unifying computer bus system, said input/output controller being configured to receive a digital signal and transmit said signal to said central processing unit and retrieve a signal comprising the resident space object's orbit from said central processing unit.

10. A system for determining a resident space object's orbit comprising:

a) a module according claim 8;

b) a transmitter for transmitting the resident space object's orbit determination provided by said module to a communication network; and c) an internal and/or external power source for powering said system.

11. The system of claim 10 wherein said module comprises an input/output controller, a random access memory unit, a hard drive memory unit, and a unifying computer bus system, said input/output controller being configured to receive a digital signal and transmit said signal to said central processing unit and retrieve a signal comprising the resident space object's orbit from said central processing unit.

* * * * *